United States Patent [19]

Delaney

[11] Patent Number: 4,541,195
[45] Date of Patent: Sep. 17, 1985

[54] FISHING ROD INCLUDING INTEGRAL RECHARGEABLE BITE-INDICATING MEANS

[76] Inventor: Edward A. Delaney, Box 633, Marcus, Iowa 51035

[21] Appl. No.: 604,178

[22] Filed: Apr. 26, 1984

Related U.S. Application Data

[63] Continuation-in-part of Ser. No. 252,997, Oct. 7, 1981, abandoned.

[51] Int. Cl.$^4$ ............................ A01K 97/12; H02J 7/02
[52] U.S. Cl. ............................................. 43/17; 320/2; 320/4; 320/48
[58] Field of Search .................. 43/17, 17.5, 17.6; 320/2, 3, 4, 48; 340/636

[56] References Cited

U.S. PATENT DOCUMENTS

| | | | |
|---|---|---|---|
| 2,349,077 | 5/1944 | Comparelli | 43/17 |
| 2,863,251 | 12/1958 | Ackerman | 43/17 |
| 3,624,689 | 3/1970 | Rizzo | 43/17 |
| 3,711,847 | 1/1973 | Barrows | 43/17 |
| 3,862,509 | 1/1975 | Petersen, Jr. | 43/17.5 |
| 3,969,839 | 7/1976 | Ziegler | 43/17.6 |
| 4,026,059 | 5/1977 | Ochs | 43/17.5 |
| 4,223,466 | 9/1980 | King | 43/18 R |
| 4,276,711 | 7/1981 | Mathauser | 43/17 |
| 4,379,988 | 4/1983 | Mattatall | 320/48 X |
| 4,398,139 | 8/1983 | Prinsze | 320/2 |

*Primary Examiner*—Nicholas P. Godici
*Assistant Examiner*—M. Jordan
*Attorney, Agent, or Firm*—Dressler, Goldsmith, Shore, Sutker & Milnamow, Ltd.; Dressler, Goldsmith, Shore, Sutker & Milnamow, Ltd.

[57] ABSTRACT

An improved balanced fishing rod is disclosed having line-tension-responsive indicating means operable to produce a visual indication when tension on the fishing line exceeds a predetermined value. The indicating means includes a rechargeable direct-current voltage source having a pair of terminals sealed to the fishing rod, a charging diode enabling the voltage source to be recharged while remaining sealed to said fishing rod, and a light-emitting diode connected in parallel with the charging diode. The charging diode is reversely positioned with respect to the light-emitting diode so that an electric current emanating from the voltage source will pass through and light the light-emitting diode and not pass through the charging diode, while an electric current emanating from a charging battery will pass through the charging diode and not the light-emitting diode to recharge the voltage source without lighting the light-emitting diode. The indicating means further includes line-tension-responsive switch means operable to complete an electrical circuit including the voltage source and the diodes.

4 Claims, 6 Drawing Figures

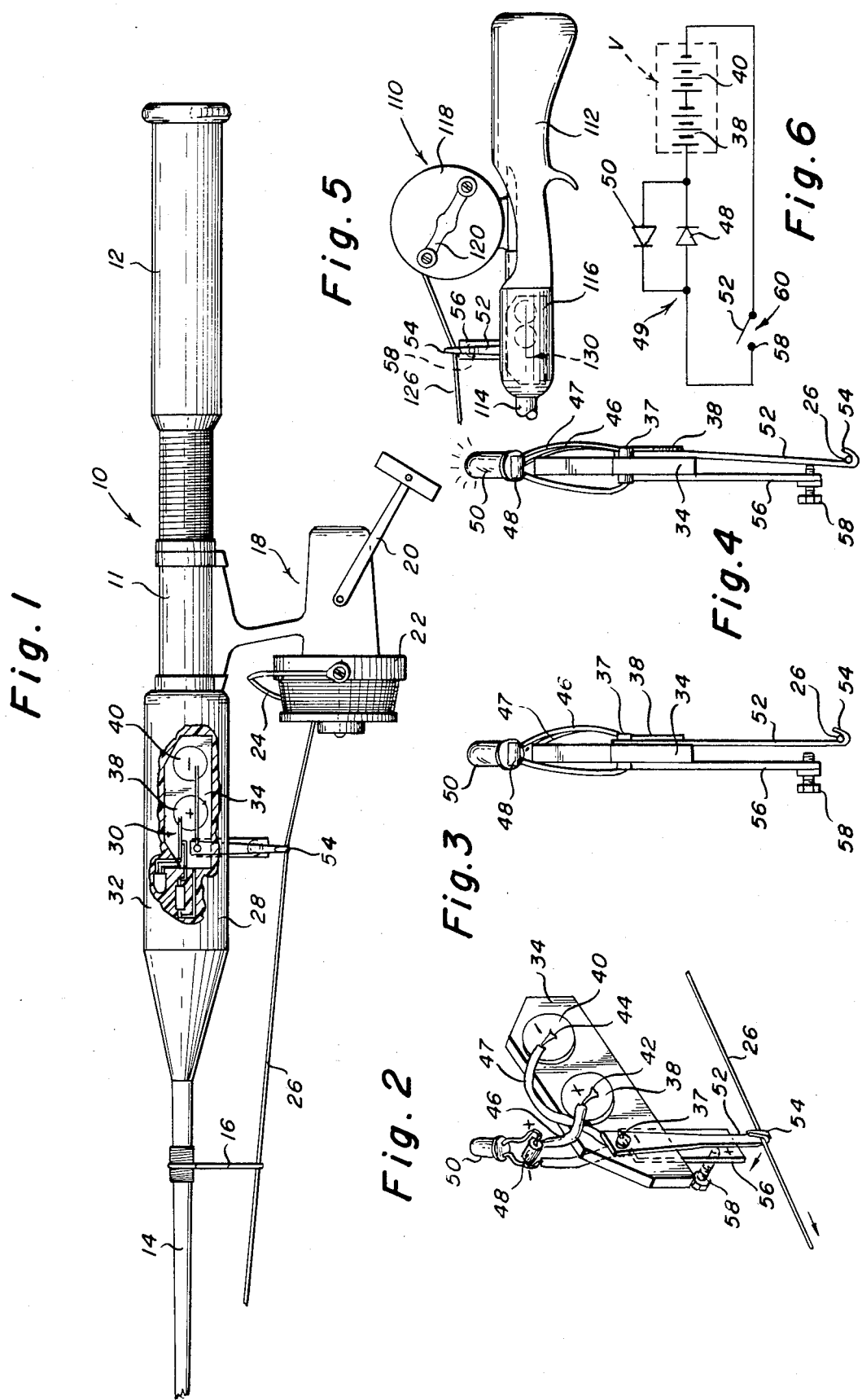

FISHING ROD INCLUDING INTEGRAL RECHARGEABLE BITE-INDICATING MEANS

This application is a continuation-in-part of my prior application Ser. No. 252,997 filed Oct. 7, 1981 now abandoned.

BACKGROUND OF THE INVENTION

Signaling or indicating devices for alerting an angler to the presence of a fish on the line are known in the art. These known devices, however, are all in the form of accessories designed to be purchased separately and attached in some fashion to the fishing rod. Signaling devices of this type are disclosed in the patents to Sleeger U.S. Pat. No. 2,643,371 and Montgomery U.S. Pat. No. 3,959,910 and in the British Pat. No. 1,327,797.

These attachment-type devices suffer several disadvantages. They may be quite bulky and heavy, and when attached to the rod, impair the balance of the rod so that casting becomes difficult. Some lighter weight devices are fragile and easily broken or the wiring may become easily impaired should the rod or the device be dropped. Some devices, such as the Sleeger device, utilize an incandescent bulb which is subject to easy breakage and will burn out after a period of use. In addition, the known attachment-type devices are not waterproof and, while fishing rods are not intended for use in water, it is not unusual for a rod to be accidently dropped or be pulled into the water. Nor is it unusual for a fisherman to be remote from a source of electricity, and require recharging of the batteries which power the signaling device.

The integral fishing rod and rechargeable indicating device of the instant invention overcomes these and other disadvantages.

OBJECTS OF THE INVENTION

The primary object of the present invention is to provide a balanced fishing rod including an integral, rechargeable bite indicating device.

It is a further object of the invention to provide a fishing rod including a rechargeable bite indicating device in a waterproof, light-weight housing.

Another object of the invention is to provide a fishing rod and integral bite indicating device having simple electrical circuitry and a light emitting diode molded into the housing, the circuitry including a second diode which is located to permit recharging of the batteries at the fishing location and remote from an electrical outlet while the batteries remain sealed within the waterproof housing in electrical engagement with the light-emitting diode, the entire device being molded onto the rod to form a unitary apparatus.

Yet another object of the invention is the provision of a fishing rod including an integral bite indicating device which may be used or not as the angler desires.

BRIEF DESCRIPTION OF THE DRAWING

Other objects and advantages of the invention will become apparent from a study of the following specification when viewed in the light of the accompanying drawing, in which:

FIG. 1 is a side elevational view of the apparatus of the present invention wherein the rod is a conventional spinning rod;

FIG. 2 is a perspective view of the indicating device of the present invention;

FIG. 3 is an enlarged end view of the indicating device of the present invention;

FIG. 4 is an enlarged end view of the indicating device with the switch closed and the light emitting diode activated;

FIG. 5 is a fragmentary side view of the present invention illustrating the manner in which the indicating device is molded upon a conventional bait casting rod; and FIG. 6 is a schematic illustrating the electrical circuitry of the bite indicating device of the present invention.

DETAILED DESCRIPTION

Referring now to FIG. 1, the apparatus 10 of the present invention is illustrated in the form of a spinning rod 11 having a handle 12 and a spinning reel 18 which includes a reel handle 20, flexible fishing line supply means 22, and a bail 24. Line 26 extends from supply means 22 through line receiving hooks 54 and line guide means 16 to the forward end of the pole (broadly indicated as 14). The function of hook 54 will be explained in detail below. Rod 11 further includes bite indicating device 30 partially incorporated in waterproof molded synthetic plastic housing 28. Housing 28 is formed of a thermosetting plastic material and is molded into the longitudinal axis of rod 11 adjacent reel 18. As shown, indicating device 30 is arranged in the butt portion 32 of housing 28, the forward portion of the housing being tapered if desired. As clearly shown in FIG. 1, line-tension-responsive indicating device 30 is very small, and the circumference of housing 28 is approximately the same as that of handle 12. The entire bite indicating device 30 weighs less than ½ oz. prior to its incorporation in housing 28 so that, although device 30 is arranged on one side of rod 11, its light weight does not affect the balance achieved by the circumferential molded housing 28.

The details of line-tension-responsive indicating means 30 are clearly shown in FIG. 2. A battery holder 34, formed from a plate of nonconductive material, such as plastic, includes holes which receive a pair of rechargeable batteries 38 and 40. Batteries 38 and 40 constitute a direct current voltage source having a pair of oppositely arranged terminals 42 and 44 (terminal 42 providing an exposed positive plate and terminal 44 providing an exposed negative plate) to which are connected charging diode 48 and light-emitting diode 50. Terminals 42 and 44 are sealed to fishing rod 11 within molded plastic housing 28.

The electrical circuit is schematically illustrated in FIG. 6. As shown, light-emitting diode 50 is connected in parallel across the charging diode 48 in a parallel branch 49 so that both diodes 48 and 50 are connected at one end with one terminal of the direct-current voltage source V, and at the other end with the other terminal of the voltage source via the line-tension-responsive switch means 60 constituted by switch arms 52 and 56. Charging diode 48 may be any 1.5 or 2.5 amp connecting diode, such as the ECG 116 diode made by Sylvania and the voltage source V may be a pair of series-connected 1.4 volt rechargeable hearing aid batteries.

It is stressed that diodes 48 and 50 are reversely positioned so that, when switch 60 closes when a fish is caught, electrical current will flow from the positive terminal of battery 38 through light-emitting diode 50 to actuate the same. Diode 48, being reversely positioned relative to diode 50, does not allow current to flow through it under these circumstances. However, with switch 60 open and a battery-operated charger in place, the current flows through diode 48 to recharge the batteries, but diode 50 is now reversely positioned to prevent current flowing through it. As a result, batteries 38 and 40 can be recharged without losing current to light diode 50.

Accordingly, charging diode 48 permits batteries 38 and 40 in the sealed housing 28 to be recharged in the field from a portable battery charger without removing them from housing 28 and thus destroying the waterproof quality thereof. The diode 48 provides a pathway for charging current from a direct current source, preferably a 9-volt battery charger, to reach the batteries without passing through light-emitting diode 50. The battery charger is used by connecting it to the switch arms 52 and 56 which extend from housing 28. When the charger is properly connected—positive to positive and negative to negative—charging diode 48 will permit current to pass through the batteries, thus charging the batteries. Current flowing in that fashion will not pass through light-emitting diode 50 to activate the light.

To define the role of charging diode 48 more specifically, batteries 38 and 40 may be charged by means of a 9-volt battery having a pair of alligator clips on lead wires connected thereto to provide one positive and one negative lead wire. The alligator clip on the positive lead wire is connected to positive adjusting arm 56 while the clip on the negative lead wire is connected to negative switch arm 52. Direct current is thus passed from the battery through the positive lead wire and adjusting arm 56 to the anode side of charging diode 48. Current will not pass through light-emitting diode 50, but will pass through charging diode 48 to the positive side of battery 38, out the negative side of battery 38 to the positive side of battery 40, out the negative side of battery 40 to the negative side of the battery charger by way of switch arm 52 and the negative lead wire, thus completing the circuit and recharging the batteries 38 and 40. For clarity, the polarities are illustrated in FIG. 2 Total recharging may be accomplished in about two minutes. Diode 48 does not rectify voltage, but merely provides a voltage pathway for recharging batteries 38 and 40. If the battery charger should be incorrectly clipped to the arms 52 and 56, the current will cause the light-emitting diode to light, thus indicating immediately that the charger should be reversed.

As further shown in FIG. 2, a line-tension-responsive switch means for activating the light-emitting diode 50 is secured to battery holder 34 by means 37 such as a nylon screw and nut. The switch means comprises a pair of parallel, electrically conductive arms 52, 56 spatially arranged on first and second sides of battery holder 34, line-receiving hook 54 and adjustable contact screw 58. Adjustable contact screw 58 is arranged in a threaded hole provided in arm 56, and hook 54 is provided at the end of resilient switch arm 52 for receiving line 26. Because the indicating device is molded into housing 28, the housing remains watertight in the area of arms 52, 56 which extend from the housing, thereby assuring that no moisture can reach the electrical components.

OPERATION

As clearly shown in FIGS. 3 and 4, adjustment screw 58 is operable to vary the distance switch arm 52 must be moved to contact the end of screw 58 and close the circuit via adjusting arm 56. Since switch arm 52 is moved by tension on line 26, the angler may predetermine the value of tension on line 26 necessary to activate the light-emitting diode, by setting the adjustable contact screw 58 accordingly. It can be appreciated that this predetermined line tension value will depend on several factors, such as weather conditions and the size and weight of the fish being sought. In FIG. 3, screw 58 has been adjusted to reduce the contact distance between arms 52 and 56 approximately by half, thus effectively reducing the value of tension on line 26 required to produce a visual signal from light-emitting diode 50. In FIG. 4, the device has been activated, the tension on line 26 having exceeded the predetermined value necessary to move resilient arm 26 into contact with screw 58, light-emitting diode 50 then indicating to the angler that a fish has taken his line.

Referring now to FIG. 5, the inventive apparatus 110 is illustrated as a combined bait casting rod and bite indicating device. Rod 114 includes handle 112 and casting rell or line supply means 118, the reel having a handle 120. Waterproof plastic housing 116 is molded upon the rod adjacent reel 118, and contains therein bite indicating device 130. In all respects, the bite indicating device is identical to the embodiment described above, except that the indicating means is reversed within the housing so that the line-tension-responsive switch means is in a position to receive line 126 leading from reel 118.

In either case, if the angler chooses not to use the bite indicating means, line 26 (or 126) is simply fed directly from the reel to the guide means, bypassing hook member 54.

In the preferred method of making the invention, the bite-indicating device is secured to the rod and the plastic housing molded around the rod while the plastic is malleable. The plastic then sets to form the waterproof housing. Alternatively, the housing, and the bite-indicating device may be formed as a separate unit, then slipped over the rod and sealed thereto. The result with both methods is an integral fishing rod and bite indicating device.

While in accordance with the Patent Statutes, the preferred embodiment of the invention has been illustrated and deacribed, it will be apparent to those skilled in the art that changes may be made without deviating from the inventive concepts set forth above.

What is claimed is:
1. An improved balanced fishing rod, comprising:
    (a) a fishing rod having a handle portion at one end thereof;
    (b) fishing line guide means mounted on said rod for guiding a flexible fishing line along the length of said rod;
    (c) line supply means mounted on said rod for supplying fishing line through said line guide means; and
    (d) line-tension-responsive indicating means adjacent said line supply means, said indicating means being operable to produce a visual indication when the line tension exceeds a predetermined value, said indicating means including:
        (1) a rechargeable direct-current voltage source having a pair of terminals sealed to said fishing rod;
        (2) a charging diode enabling said voltage source to be recharged while sealed to said fishing rod;
        (3) a light-emitting diode connected in parallel with said charging diode, said charging diode being reversely positioned with respect to said light-emitting diode so that an electric current emanating from said voltage source will pass through and light said light-emitting diode and not pass through said charging diode, while an electric current emanating from a charging battery will pass through said charging diode and not said light-emitting diode to recharge said voltage source without lighting said light-emitting diode; and (4) a pair of arms attached to said terminals and comprising line-tension responsive switch means and recharging connection means, said switch means operable when the line tension exceeds a predetermined valve for completing an electrical circuit including said voltage source and said light emitting diode, and said connection means operable when connected to an external battery to complete an electrical recharging circuit through said charging diode and said voltage source to recharge said voltage source.

2. Apparatus as defined in claim 1, wherein said fishing rod includes a molded synthetic plastic waterproof housing partially containing said indicating means, said direct-current voltage source, said chrging diode and said light-emitting diode being fully contained within said waterproof plastic housing, and said line-tension-responsive switch means extending outside said housing in watertight relationship thereto.

3. Apparatus as defined in claim 1, wherein said direct-current voltage source comprises a pair of series-connected 1.4 volt batteries.

4. Apparatus as defined in claim 1, wherein said pair of terminals are sealed to said fishing rod within a molded plastic waterproof housing.

* * * * *